(12) United States Patent
Troitski et al.

(10) Patent No.: US 6,670,576 B2
(45) Date of Patent: Dec. 30, 2003

(54) METHOD FOR PRODUCING IMAGES CONTAINING LASER-INDUCED COLOR CENTERS AND LASER-INDUCED DAMAGES

(75) Inventors: Igor Troitski, 853 Arrowhead Trail, Henderson, NV (US) 89102; Oleg Efimov, Newbury Park, CA (US); George M Jewett, Las Vegas, NV (US)

(73) Assignee: Igor Troitski, Henderson, NV (US)

(*) Notice: Subject to any disclaimer, the term of this patent is extended or adjusted under 35 U.S.C. 154(b) by 43 days.

(21) Appl. No.: 10/117,592

(22) Filed: Apr. 8, 2002

(65) Prior Publication Data

US 2003/0189031 A1 Oct. 9, 2003

(51) Int. Cl.[7] .............................................. B23K 26/00
(52) U.S. Cl. .................................................. 219/121.69
(58) Field of Search ........................ 219/121.61, 121.68, 219/121.69, 121.85; 148/525, 565

(56) References Cited

U.S. PATENT DOCUMENTS

| | | | | |
|---|---|---|---|---|
| 5,653,900 A | * | 8/1997 | Clement et al. | |
| 6,322,958 B1 | * | 11/2001 | Hayashi | |
| 6,333,485 B1 | * | 12/2001 | Haight et al. | |
| 6,392,683 B1 | * | 5/2002 | Hayashi | |
| 6,399,914 B1 | * | 6/2002 | Troitski | |
| 6,417,485 B1 | * | 7/2002 | Troitski | |
| 6,426,480 B1 | * | 7/2002 | Troitski | |
| 6,490,299 B1 | * | 12/2002 | Raevsky et al. | |
| 6,509,548 B1 | * | 1/2003 | Troitski | |

OTHER PUBLICATIONS

Linards Skuja, et al. "Laser–induced color centers in silica" Proc. of SPIE, Vol 4347 (2000) 155–167.*

* cited by examiner

Primary Examiner—M. Alexandra Elve
Assistant Examiner—Jonathan Johnson

(57) ABSTRACT

The method for producing images inside transparent materials by combination of laser-induced color centers and laser-induced damages is disclosed. The method is based on two physical phenomenon: photoionization and laser-induced breakdown. The method includes transformation of the computer image into arrangements of pixels, which should be produced as either areas of laser-induced color centers or laser-induced damages inside transparent materials. The same laser produces both color centers and laser-induced damages by controlling the energy of generated pulses. The method enables to produce several different laser-induced images inside the same transparent material so that each of them is visible inside its small space angle.

10 Claims, 3 Drawing Sheets

METHOD FOR PRODUCING IMAGES CONTAINING LASER-INDUCED COLOR CENTERS AND LASER-INDUCED DAMAGES

FIELD OF THE INVENTION

The present invention relates to methods for producing high quality laser-induced images in transparent objects using high power laser radiation creating laser-induced color centers on basis of photoIonization and laser-induced damages on basis of the breakdown phenomenon.

BACKGROUND OF THE INVENTION

A number of techniques for creating a variety of patterns on the surface and inside of transparent substrates using pulsed laser radiation are well known.

One publication disclosing such techniques is the Russian invention # 321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 3,715,734 to Fajans discloses a three-dimensional memory storage unit, which is prepared by carbonizing selected spots in a block of polymethyl-methacrylate by means of a steeply converging laser beam. The energy of the beam is applied in pulses of such duration and at such intensity that carbonization takes place only at the focal point of the beam.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

GDR Patent No. 237 972 A3 to Wiederhold et al, discloses an opaque image pattern imbedded within the inner volume of an otherwise transparent article, without surface damage, using a focused, guided laser with an intensity (power density) at the focal area that exceeds the damage threshold. For instance, to create internal marks in a material having a damage intensity threshold of 40 kW/mm² which is achievable with an average peak power of 20 kW, a laser with a 2,5 time higher peak power (50 kW) is employed, implying conditions under which ionization is reached.

U.S. Pat. No. 4,843,207 to Urbanek et al., discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He-Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev discloses a technology for creating two- or three-dimensional images inside a polymer material using penetrating electro-magnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No 5,268,862 to Rentzepis et al. discloses a method for creating three-dimensional optical memory by two UV laser light beams, typically of 532 nm. and 1064 nm. Wavelength, to change from a first, spiropyran, to a second, merocyanine, stable molecular isomeric form by process of two-photon absorption.

U.S. Pat. No. 5,575,936 to Goldfarb discloses a process and apparatus where a focused laser beam causes local destruction within a solid article, without effecting the surface thereof The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,653,900 to Clement, et al. discloses a method and an apparatus for making a moving body of material. In a preferred embodiment, the apparatus includes at least one movable galvanometer mirror capable of moving the laser beam to create a mark of a predetermined shape.

U.S. Pat. No 5,656,186 to Mourou, et al. discloses a method for controlling configuration of laser induced breakdown and ablation. The method comprises generating a beam of laser pulses in which each pulse has a pulse width equal to or less than the predetermined laser pulse width value. The beam is focused to a point at or beneath the surface of a material where laser induced breakdown is desired. The technique can produce features smaller than the spot size and Rayleigh range due to enhanced damage threshold accuracy in the short pulse regime.

U.S. Pat. No 5,786,560 to Tatah et al. discloses a method of treating a material by generating an ultraviolet wavelength laser beam having femtosecond pulses; splitting the laser beam into a plurality of separate laser beams; directing these laser beams onto a target point within a sample such that the beams overlap to create an intensity sufficient to treat the sample.

U.S. Pat. No. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. Pat. No. 6,333,485 to Haight, et al. discloses a method for minimizing sample damage during the ablation of material using a focused ultra short pulse beam. The beam is focused above the surface of a material where laser induced breakdown is desired. The region of least confusion (minimum beam waist or average spot size) is above the surface of the material in which laser induced breakdown is desired since the intensity of the beam falls in the forward direction.

U.S. Pat. No. 6,333,486 B1 to Troitski discloses method and laser system for creation of laser-induced damages to produce high quality images. Accordance to the invention, a laser-induced damage is produced by simultaneously generating breakdowns in several separate focused small points inside the transparent material area corresponding to this etch point. Damage brightness is controlled by variation of a number of separate focused small points inside the transparent material area.

U.S. patent application Ser. No. 09/583,454 to Troitski discloses method and laser system controlling breakdown process development and space structure of laser radiation for production of high quality laser-induced damage images. Accordance to the invention, at the beginning an applied laser radiation level just exceeds an energy threshold for creating a plasma condition in the material, and thereafter the energy level of the applied laser radiation is just maintain the plasma condition. Accordance to another method a laser generates a $TEM_{mn}$ radiation. The values of the integers m and n are controlled and determined so as to reproduce particular gray shades for a particular point of an image.

U.S. patent application Ser. No. 09/613,296 to Troitski discloses method and laser system for producing high quality laser-induced damage images by using material processing made before and during image creation.

The experiments described in a publication entitled "Photoionization of silicate glasses exposed to IR femtosecond pulses" (O. M. Efimov et al., Journal of Non-Crystalline Solids 253 (1999), 58–67) show that photoionization of silicate glasses is possible under infrared (IR) high-power femtosecond (about 100 fs) pulses, and color centers are generated by laser pulses at irradiance below the thresholds of laser-induced damage and catastrophic self-focusing.

The publication "System for creation of laser-induced damage images and problems of their optimization" (I. N.

Troitski, Proc. of SPIRE Vol. 3902 (2000), 489–499) describes methods for generating 3D images and portraits allowing reproduction of them within an optically transparent material with the same resolution like computer images, without sharp point structure and without significant fluctuation of gray shades.

The publication "Experience of creation of laser-induced damage images" (I. N. Troitski, Proc. of SPIE Vol. 3902 (2000), 479–488) discloses the specific system for production of laser-induced damage images. The publication "Image recording by laser-induced damages" (I. N. Troitski, Optical Memory and Neural Networks, Vol. 9, No. 4, (2000) 233–238) discusses the problems of laser-induced damage utilization for image recording.

The publication "Laser-induced color centers in silica" (Linards Skuja,et al., SPIE Volume 4347 (2000) 155–167) reviews the color centers contributing to the optical absorption spectrum of synthetic silica glass in the near infrared— to vacuum UV range. The optical properties of common impurities/dopants in synthetic silicas used in laser optics are discussed.

SUMMARY OF THE INVENTION

The present invention has its principal task to provide a method for production of unique laser-induced images based on areas of laser-induced color centers and laserinduced damages.

One or more embodiments of the invention comprise a method for division of computer image pixels into two arrangements: the first includes pixels, which should be produced by the areas of color centers, the second arrangement contains pixels, which should be produced by laser-induced damages.

One or more embodiments of the invention comprise a method for generation of UV radiation inside the predetermined area of the material, which is opaque for UV radiation but is transparent for IK light, by focusing IK ultra short (from femtosecond to picosecond) laser pulsed radiation into this area.

One or more embodiments of the invention comprise a method for producing laser-induced images using color centers created by light radiation with broadened spectral, which is generated by IK ultra short (from femtosecond to picosecond) laser pulsed radiation focused into predetermined area.

One or more embodiments of the invention comprise a method for producing laser-induced images containing color centers and laser-induced damages by the laser generating IK ultra short (from femtosecond to picosecond) pulses with operated energy.

One or more embodiments of the invention comprise a method for producing the single-layer laser-induced image rendering all pixels of corresponding computer image by creating the arrangement of laser-induced damages and the laser-induced color centers, which are located in immediate proximity to laser-induced damages and which reproduce all missing pixels, which can not be produced by laser-induced damages.

One or more embodiments of the invention comprise a method for producing several different laser-induced images inside the same transparent material so that each of them is visible inside its small space angle.

DETAILED DESCRIPTION OF THE INVENTION

Figure 1:
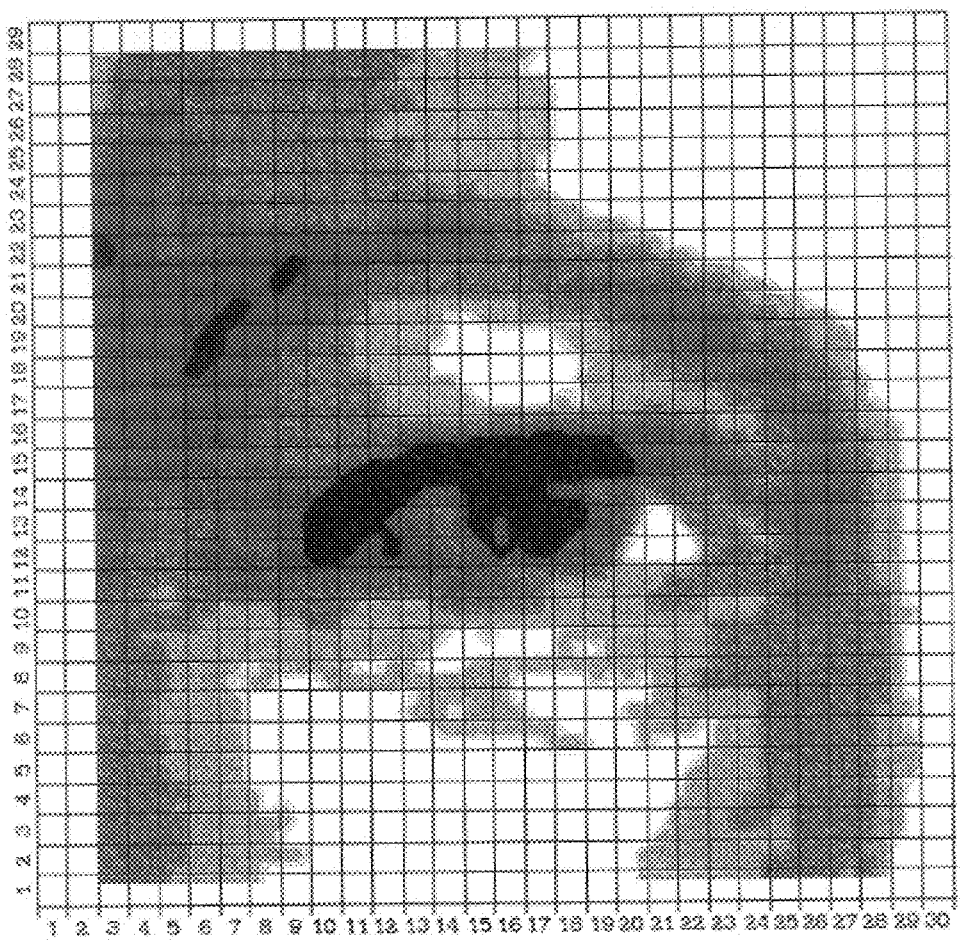
FIG. 1 illustrates fragment of the computer portrait containing 29×29 pixels. All pixels with both odd coordinates are produced by laser-induced damages; all others pixels are produced by areas of color centers.

The invention comprises the method for production of laser-induced images inside optically transparent materials. In general, the invention relates to methods, in which laser energy is utilized to generate laser-induced color centers, using photoionization, and laser-induced damages based on the breakdown phenomenon.

Examination of all aforementioned Patents and scientific publications shows that it is possible to produce laser-induced etch points inside transparent materials by using two physical phenomenon: photoionization and breakdown. Photoionization of glasses leads to the creation of laser-induced color centers, which are generated by laser pulses at irradiance below the thresholds of laser-induced damage and catastrophic self-focusing. Breakdown creates laser-induced damages, which are generated by laser pulses at irradiance above the threshold, the value of which depends on the transparent material and parameters of focused radiation.

The laser-induced color centers, appearing as a result of photoionization, and laser-induced damages, appearing as a result of breakdown, have different optical characteristics. The purpose of the present invention is to teach how, arranging color centers and laser-induced damages and using features of their optical characteristics, to create unique laser-induced images.

Visible points or areas created inside a transparent material by laser radiation are referred to as laser-induced etch points or etch points. So laser-induced etch point can be created either by photoionization or by breakdown. In the first case, the laser-induced etch point is the set of color centers, in the second case, the laser-induced etch point is the laser-induced damage.

The laser-induced image is the arrangement of laser-induced etch points reproducing pixels of the corresponding computer image inside the transparent material. Thus a laser-induced image is a plurality of laser-induced color centers and laser-induced damages inside a transparent material created by a pulsed laser beam, which is periodically focused at the predetermined points of the material. The image becomes visible by scattering and absorption of the exterior light.

To provide a better understanding of the essence of the method it is expedient first to consider the process of generation of both color centers and laser-induced damages.

It was found that the generation of the color centers is a result of the photoinduced transition of electrons from the valence band to the levels situated above the electron mobility threshold. The ways for this transition can be very different. For example, the electron mobility threshold of alkali-silicate glasses is placed in the region of about 6 eV and their coloration is caused by linear absorption of ultraviolet (UV) radiation in the region of 200–230 nm. The color centers inside these glasses can be generated in a result of two-photon ionization of glass matrix under high power laser radiation at wavelength below 400 nm. Three- and more photon excitation of these glasses are impossible under intensity below laser-induced damage threshold.

The electron mobility boundary in lead-silicate glasses is hidden under the lead absorption band. Therefore, linear excitation of these glasses is possible just in a very thin layer (<<1 μm) near a surface, i.e. linear color center formation on the bulk of lead-silicate glasses has not observed. However, a high density of electron states of lead in the band gap of these glasses increase dramatically a possibility of multiphoton excitation through virtual levels. As a result, not only two-, but even three-photon absorption in these glasses is possible under high power radiation at wavelength below 600 nm, i.e. under visible radiation.

The experiments described in a publication entitled "Photoionization of silicate glasses exposed to IR femtosecond pulses" (O. M. Efimov et al., Journal of NonCrystalline Solids 253 (1999), 58–67) show that photoionization of different transparent materials is possible even under infrared (IR) high-power femtosecond (about 100 fs) pulses. It is very important that in this case, as in the cases mentioned above, color centers are generated by laser pulses at irradiance below the thresholds of laser-induced damage and catastrophic self-focusing. The authors explain the creation of color centers by IR ultra short (from femtosecond to picosecond) pulses by following way: when laser beam is focused and laser power runs up $10^{12}$–$10^{13}$ W/cm$^2$, the radiation spectrum is broadened so that it contains wavelengths up to 230 nm (5.6 eV), and therefore two-photon ionization and even single-photon ionization can occur. Radiation spectrum broadening arises from peculiar interaction of ultra short laser pulses with transparent material.

Thus, focusing UV, visible or IR pulses, we can generate color centers in the predetermined point inside material. Even if a material is opaque for UV radiation and linear generation of color centers are impossible, its nonlinear excitation by visible or IR radiation can be possible.

One or more embodiments of the invention comprise a method for producing laser-induced images containing color centers inside the material, which is opaque for UV radiation but is transparent for IR light. According to the method, laser-induced color centers are generated by UV radiation arising in a result of focusing IK ultra short (from femtosecond to picosecond) laser pulsed radiation into predetermined areas.

Nonlinear generation of color centers has very important features:

1) This color center formation effect is definitely recorded at power density Q, which is essentially smaller than optical breakdown threshold $Q_0$ (for example, $Q = (10^{-2}$–$10^{-4}) Q_0$).
2) The color centers are created just in a small area around the focal spot of radiation because of nonlinearity.
3) The color centers form the area, which has the shape, which is similar to focal spot area.
4) The area containing the color centers can have different absorption (darkness), which is determined by the parameters of pulsed radiation. One or more embodiments of the invention comprise a method wherein the etch points used for production of images inside transparent materials are created as the aggregate of laser-induced color centers inside the predetermined areas. These color centers are produced in a result of photoionization generated by laser radiation with energy lower the breakdown threshold.

Laser-induced damage occurs, when the laser irradiance exceeds a breakdown threshold, which is characteristic of the material. When the threshold energy value is exceeded, a plasma condition is created. Generation of the plasma is associated with a shock wave, which causes a cleavage in transparent material. Most of aforementioned patents disclose methods for producing images inside transparent materials by using laser-induced damages created by pulse IR laser radiation with pulse width of tens nanoseconds. Such laser-induced damages have random star shapes, although the damages are produced by laser beam with the same energy. As a result, these images have not good quality and special methods for creating damages with improved shapes (without star structure) were developed. Another way for generating improved damages is using ultra short pulses, for example, IR femtosecond and picosecond pulses.

Ultra short laser pulses have two unique features, extremely high power coupled with low level of pulse energy. Therefore, the laser-induced damage of transparent materials is occurred under conditions of low absorbed energy. In a result, the thermal stresses build up in the materials during irradiation, and the extensive cracking may be effectively avoided by using ultra short laser pulses instead of nanosecond pulses. In this case laser-induced damages do not have star structure and can have small sizes.

One or more embodiments of the invention comprise a method for producing images containing laser-induced damages of small sizes and without star structure by focusing IR ultra short (from femtosecond to picosecond) laser pulsed radiation into the predetermined areas.

Thus, using proper laser pulses, it is possible, controlling their parameters, to create either laser-induced color centers or laser-induced laser damages. This control is very easy, because power density necessary for creation of color centers is essentially smaller than optical breakdown threshold.

One or more embodiments of the invention comprise a method wherein the image, which is the combination of laser-induced damages and the color centers, is produced by the same laser by controlling the energy level of generated pulses.

Optical characteristics of color centers area and laser-induced damages are different:

A laser-induced damage is an area, through which light does not penetrate, so that the light is only scattered by the damage region. An area of color centers, quite the contrary, absorbs the light.

A laser-induced damage looks like bright area. A color center area looks like gray region.

Desired brightness of the laser-induced damage is reproduced by controlling its sizes. Gray shades of color center area can be transferred by controlling absorption level.

The shape of a laser-induced damage is formed by both the focal spot and breakdown process and therefore it differs from the focal spot shape.

The shape of a color center area is restricted by radiation shape and therefore it is similar to the small area around the focal spot.

Distance between adjacent laser-induced damages should be much larger than between adjacent areas containing laser-induced color centers. Practically adjacent color centers areas can be close to each other up to total overlapping. Fatal distance between adjacent laser-induced damages is a result of residual stress of the breakdown and the distance increases, when sizes of the damages rise.

Thus optical characteristics of laser-induced etch points depend on the pulse energy: the etch points are aggregates of color centers if pulse energy is sufficient large to create photoionization, but below the breakdown threshold; the etch points are the laser-induced damages if the pulse energy above the breakdown threshold, the value of which depends on the transparent material.

Registered features of laser-induced damages and color centers exert influence on the creation of laser-induced images. Combination of features gives a chance to produce unique images.

EXAMPLE 1

Let us suppose that we should produce bright and contrast laser-induced portrait reproducing all pixels describing corresponding computer image. It is also demanded that all etch points should be placed on the same layer (single-layer laser-induced image). More bright and contrast etch points are the laser-induced damages therefore it is reasonable as etch points to use these damages. However, computer pixels locate compactly without any distance between them and therefore if we will produce the laser-induced damages in the material points corresponding to all pixels we will have internal split. Materially, we can reproduce only such pixels, which correspond to damages, between which distances are larger than $d_0$ ($d_0$ is minimal distance between adjacent damages, when the internal split does not occur). In other words using only laser-induced damages, it is not possible to reproduce all pixels in one layer laser-induced portrait. In this case, all missing pixels can be reproduced by laser-induced color centers, which can be created in immediate proximity to laser-induced damages.

FIG. 1 illustrates fragment of the computer portrait containing 29×29 pixels. Let us suppose that minimal distance between adjacent laser-induced damages equal to size of the damage. Then, for example, all pixels of which the both coordinates are odd, can be produced by laser-induced damages and all others should be produced by the areas of color centers. The integral gray shade of each pixel is transferred by corresponding level of scattering light from the laser-induced damages or by corresponding absorption level of color centers area.

Figure 2:
FIG. 2 shows the laser-induced portrait produced so that etch points corresponding to pixels with both odd coordinates are the laser-induced damages but etch points corresponding to others pixels are the areas of laser-induced color centers.

FIG. 2 shows the laser-induced portrait produced in accordance with the method: etch points corresponding to pixels with both odd coordinates are laser-induced damages; etch points corresponding to others pixels are areas of laser-induced color centers. These areas of color centers are placed between laser-induced damages so there is no empty space inside the image.

One or more embodiments of the invention are a method for creation of single-layer laser-induced image rendering all pixels of corresponding computer image by arrangement of laser-induced damages, between which distances are larger than do, and by laser-induced color centers, which are located in immediate proximity to laser-induced damages and which reproduce all missing pixels.

Let us suppose that we should produce an image containing laser-induced damage points and colored points. It is rather simple to make using a laser generating higher harmonics (visible and UV) of radiation as well as a fundamental one (IR). For example, we can use Nd:YAG laser with a possibility to generate second, third, and forth harmonics. In this case we can switch between the effects of color centers formation and laser-induced damages just switching the wavelength of radiation. For higher harmonics (depends on material) we will reach just multiphoton coloration without damage controlling the efficiency of transformation and a number of pulses. For fundamental mode we will reach just damage without coloration because of absence of multiphoton absorption. Switching between different wavelengths can be done by a number of well-known methods using polarization, spectral, or mechanical control.

One or more embodiments of the invention comprise a method for producing laser-induced images containing color centers and laser-induced damages by the same laser, controlling the number of harmonics generated by the said laser. This laser generates fundamental radiation and higher harmonics, which can be selected by controlling the wavelength of generated pulses.

Gray shades of color centers area depend on the absorption level, which is determined by the number of color centers created inside the area. Consequently changing the number of color centers, it is possible to control the gray shades of their area without changing the sizes and the shape of the area. The number of color centers depends on the total dosage of laser radiation. So the increase of pulse energy and the number of pulses gives augmentation of color centers number what results in the increase of gray level.

One or more embodiments of the invention comprise a method for producing the required gray shades of the area of color centers by controlling the number of color centers created inside the area. In particular, the number of color centers controlled by the pulse energy and the number of pulses.

Using long-focal-length optics, it is possible to create color centers area in the form of a long cylinder with small diameter. So color centers area is visible due to light absorption, this area is good visible only along the direction of cylinder axis. When the angle between the cylinder axis and the bopresight allocation increases, the visibility becomes lower. Practically, we do not see this color center area when angle between the cylinder axis and the bopresight allocation becomes larger several degrees of arc.

For laser-induced damage in the form of a long cylinder we have another situation. So laser-induced damage scatters the external light, it has the best visibility, when the angle between the cylinder axis and the bopresight allocation is equal to 90°. It has lower visibility along the direction of cylinder axis.

One or more embodiments of the invention are a method wherein desirable shapes of areas, containing color centers, are created by controlling shapes of the areas, in which laser radiation generates color centers.

One or more embodiments of the invention are a method for creation of laser-induced color centers areas and laser-induced damages, visibility of which changes in depend on the bopresight allocation.

The opportunity to create laser-induced etch points which are visible inside small space angle gives a chance to produce several different laser-induced images inside the same transparent material so that every of them is visible inside its space angle.

EXAMPLE 2

Let us suppose that the transparent material is a parallelepiped and we should produce two different laser-induced images inside the sample and so that the first image is visible only from the front but the second is visible only from the side of this parallelepiped. We can make this, if we produce every image by thin elongated areas of color centers allocated perpendicular to the corresponding image plane. So the first image is produced by laser-induced elongated etch points, which are perpendicular to the front surface of the parallelepiped and the second image is produced by laser-induced elongated etch points, which are perpendicular to its cheek.

Figure 3:
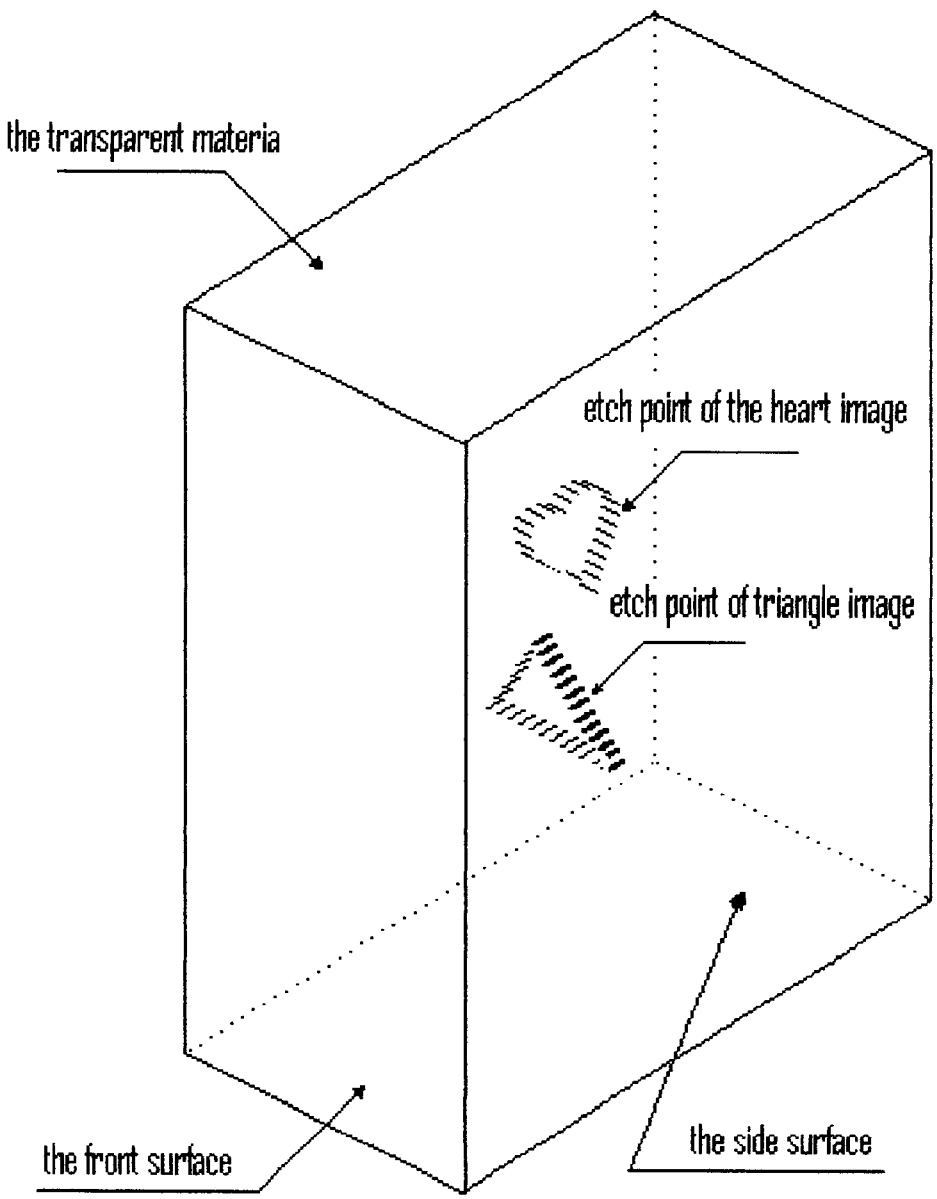
FIG. 3 illustrates production of two images inside the same parallelepiped glass: one is the triangle and it is visible only from front surface, another has the heart shape and it is visible from the side surface; both images are produced by oblong color centers areas; which for the triangle are perpendicular to the front surface of the glass, but for the heart image are perpendicular to the side surface.

FIG. 3 illustrates production of two images inside the same parallelepiped glass: one is the triangle and it is visible only from front surface, another has the heart shape and it is visible from the side surface; both images are produced by oblong color centers areas; which for the triangle are perpendicular to the front surface of the glass, but for the heart image are perpendicular to the side surface.

EXAMPLE 3

Let us suppose that we should produce two different laser-induced images inside the same transparent material and so that the first is visible from every quarter, but the second is visible only from the front. We can make this, if we produce the first image by laser-induced damages, but the second image—by thin elongated areas of color centers allocated perpendicular to the front surface of the parallelepiped. It is interesting to notice, that in this case, thin elongated areas of color centers, creating the second laser-induced image, can be stationed between laser-induced damages, creating the first image.

One or more embodiments of the invention are a method for creation of several laser-induced images, which are visible depending on the bopresight allocation.

There are many kinds of glasses in which color centers can be eliminated by heating the glass. The effect can be reach also by long exposure in short wavelength area of spectrum—optical bleaching. So using the glasses it is possible the second image of example 3 is eliminated by heating the glass and after that we will see only one image produced by laser-induced damages.

One or more embodiments of the invention are a method of elimination an image created by color centers without distortion of image containing laser-induced damages.

It was mentioned above that the arrangement of color centers looks as gray area. It is a result of the fact that absorption of the area inside pure glasses has broad spectra. Using special dirt or impurities, it is possible to create color centers area with narrow absorption spectra. In this case color centers area is not gray, but has color corresponding to the absorption spectra.

The method for producing images inside transparent materials by combination of laser-induced color centers and laser-induced damages comprises the following steps:

Step 1: transformation of the computer image into arrangement of pixels, which should be produced as laser-induced etch points inside transparent materials;

Step 2: division of the arrangement into two aggregates of pixels: the first arrangement includes pixels, which should be produced by the areas of color centers; the second arrangement contains pixels, which should be produced by laser-induced damages;

Step 3: laser-induced damages corresponding to the second arrangement are substituted for the areas of color centers, if the distances between adjacent laser-induced damages are smaller than the minimal distance do;

Step 4: the parameters of focusing optical system are determined so that the area of color centers has desirable shape;

Step 5: the parameters of laser radiation is determined so that the laser pulses can produce photoionization into any desirable area inside the transparent material and the same pulses with higher energy can be able to produce small laser-induces damages without star structure;

Step 6: the pulsed laser radiation is generated so that pulse energy can be controlled;

Step 7: the laser radiation is directed into the point around of which the area of color centers should be created; the laser radiation has the level, which is enough high for photoionization but which is lower than breakdown threshold;

Step 8: the laser radiation is directed into the point where the laser-induced damage should be produced; the pulse energy exceeds the breakdown threshold.

We claim:

1. A method for production of images inside transparent material, which contains laser-induced color centers, comprising:

generating laser radiation to which the said material is transparent; the said radiation is able (in result of interaction with transparent material) to create radiation of broadened spectrum to which the said material can be opaque;

periodically focusing the said laser radiation at the predetermined material areas, so that all areas corresponding to all pixels of the given displayed image are treated without distances between adjacent etch points;

creating color centers by the photoionization of the said material areas; the said photoionization generated by UV radiation of the said radiation with broadened spectrum;

controlling optical characteristics of color centers by focusing IK ultra short laser pulsed radiation into predetermined areas of the desirable shapes;

creation of the required color of the area containing the arrangement of color centers by using special dirt or impurities of the transparent material.

2. A method in accordance with claim 1 wherein UV radiation is generated by IR ultra short (from femtosecond to picosecond) laser pulsed radiation focused into predetermined locations of the material, which is transparent for IR radiation and which can be opaque for UV radiation.

3. A method in accordance with claim 1 wherein optical characteristics of color centers are controlled by the shapes of the area, in which IK ultra short laser pulsed radiation is focused, and by the power of the UV radiation contained into the said radiation with broadened spectrum.

4. A method in accordance with claim 1 wherein a laser-induced image is produced without distance between etch points by periodically focusing laser radiation at all points, corresponding to pixels of a displayed image and by creating color centers at the said points without distance between adjacent etch points.

5. A method for producing images inside transparent materials by the combination of etch points absorbing exterior light (laser-induced color centers) and etch points reflecting exterior light (laser-induced damages) comprising:

division of all pixels of displayed image into two groups: the first group contains the pixels, which correspond to the material areas, where color centers should be produced; the second group contains the pixels, which correspond to the material areas, where laser-induced damages should be produced;

generating and periodically focusing laser radiation at the predetermined locations of the said material corresponding to all pixels of the displayed image without distances between adjacent etch points;

controlling parameters of the said laser radiation so that it is possible to create either the photoionization or the breakdown at the said material locations;

generation of the photoionization at the said locations corresponding to the pixels of the first group;

generation of the breakdown at the said locations corresponding to the pixels of the second group.

6. A method in accordance with claim 5 wherein a laser-induced image is produced without distances between etch points due to the fact, that the space between laser-induced damages are filled by the color centers.

7. A method in accordance with claim 5 wherein laser-induced damages and the color centers are produced using the laser, irradiating fundamental radiation and higher harmonics, by controlling the wavelength of generated pulses.

8. An apparatus for production of laser-induced image inside a transparent material, which contains color centers and laser-induced damages, comprising:

means for transformation of a displayed image into arrangement of pixels corresponding that points of the said material at which etch points should be produced and means for division of all pixels of displayed image into two groups: the first group contains the pixels, which correspond to the material areas, where color centers should be produced; the second group contains the pixels, which correspond to the material areas, where laser-induced damages should be produced;

means for generating laser pulsed radiation, which is able to create both the photoionization of the said transparent material and the breakdown inside the said material;

means for controlling parameters of the said laser radiation so that this radiation creates either the photoionization or the breakdown at the said material locations;

means for periodically focusing the said laser radiation at all said predetermined material points, so as to cause either the photoionization of these material areas or the breakdown inside the said areas;

means for controlling optical characteristics of color centers so that their visibility changes depending on the direction of observation.

9. An apparatus in accordance with claim 8 wherein IR ultra short (from femtosecond to picosecond) pulses are generated with operated energy.

10. An apparatus in accordance with claim 8 wherein fundamental radiation and higher harmonics are generated by controlling the wavelength of generated pulses.

* * * * *